(12) United States Patent
Huntley et al.

(10) Patent No.: US 8,908,186 B2
(45) Date of Patent: Dec. 9, 2014

(54) APPARATUS FOR THE ABSOLUTE MEASUREMENT OF TWO DIMENSIONAL OPTICAL PATH DISTRIBUTIONS USING INTERFEROMETRY

(75) Inventors: Jonathan Mark Huntley, Loughborough (GB); Pablo Daniel Ruiz, Loughborough (GB); Taufiq Widjanarko, Loughborough (GB)

(73) Assignee: Loughborough University, Loughborough (GB)

( * ) Notice: Subject to any disclaimer, the term of this patent is extended or adjusted under 35 U.S.C. 154(b) by 212 days.

(21) Appl. No.: 13/386,485

(22) PCT Filed: Jul. 20, 2010

(86) PCT No.: PCT/GB2010/001379
§ 371 (c)(1),
(2), (4) Date: Mar. 27, 2012

(87) PCT Pub. No.: WO2011/010092
PCT Pub. Date: Jan. 27, 2011

(65) Prior Publication Data
US 2012/0176625 A1    Jul. 12, 2012

(30) Foreign Application Priority Data
Jul. 23, 2009 (GB) .................... 0912799.4

(51) Int. Cl.
*G01B 9/02* (2006.01)
*G01B 11/24* (2006.01)

(52) U.S. Cl.
CPC ........ *G01B 11/2441* (2013.01); *G01B 9/02044* (2013.01); *G01B 9/02008* (2013.01); *G01B 9/0209* (2013.01); *G01B 2290/25* (2013.01)
USPC ........................................ 356/456

(58) Field of Classification Search
CPC .......... G01B 11/2441; G01B 9/02044; G01B 9/0209; G01B 9/02008; G01B 2290/25; G01B 9/023; G01J 3/26; G01J 3/45; G01J 3/453; G01J 9/02; G01J 9/0246; G01J 2003/45; G01J 2003/451
USPC .......................... 356/451–456, 489, 495, 511
See application file for complete search history.

(56) References Cited

U.S. PATENT DOCUMENTS 5,675,513 A * 10/1997 Hammer .................. 702/86
2005/0001172 A1    1/2005 Harrison
(Continued)

OTHER PUBLICATIONS

The Search Report dated Sep. 25, 2009 for Application No. GB0912799.4, 9 pages.

*Primary Examiner* — Tarifur Chowdhury
*Assistant Examiner* — Michael P LaPage
(74) *Attorney, Agent, or Firm* — Hollingsworth Davis, LLC

(57) ABSTRACT

An apparatus for the absolute measurement of a two dimensional optical path distribution comprising: a light source (4) for illuminating an object (26) with light having a plurality of wavelengths: an interferometer (12) for forming an image of at least part of the object, which image comprises a broad band interferogram; a hyperspectral imager (30) in optical communication with the interferometer for spectrally separating the broad band interferogram into a plurality of narrow band two dimensional interferograms (72, 74, 76); a register (38) for spatially registering the narrow band interferograms; an extractor for extracting one dimensional intensity signals from corresponding pixels in each narrow band interferogram; and a calculator (100) for calculating the frequency for each point on the object from a one dimensional intensity signal associated with that point.

19 Claims, 12 Drawing Sheets

(56) References Cited

U.S. PATENT DOCUMENTS

| | | |
|---|---|---|
| 2007/0002327 A1 | 1/2007 | Zhou et al. |
| 2007/0206201 A1* | 9/2007 | de Groot et al. ............. 356/512 |
| 2008/0094613 A1 | 4/2008 | De Boer et al. |
| 2008/0123103 A1 | 5/2008 | Fujii |
| 2010/0321699 A1* | 12/2010 | Lyon et al. .................... 356/450 |

* cited by examiner

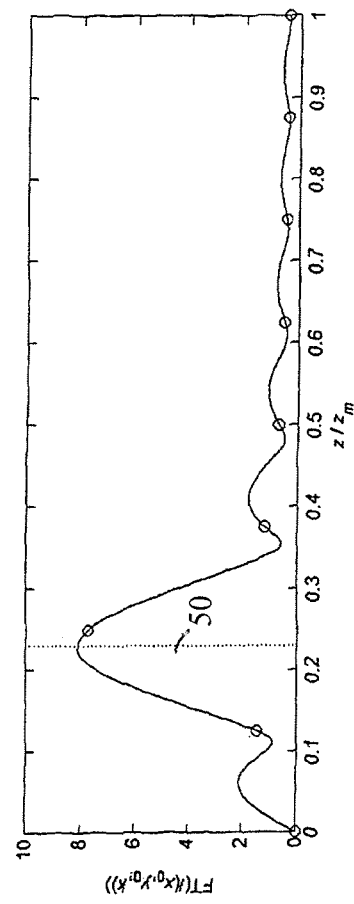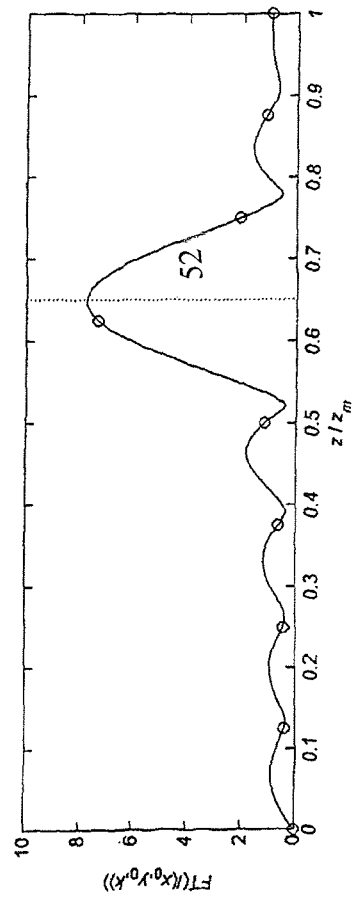

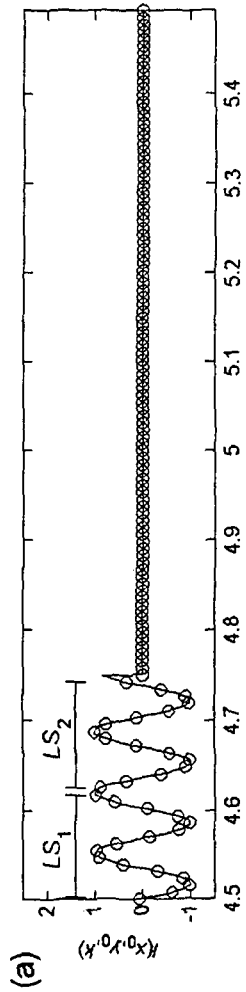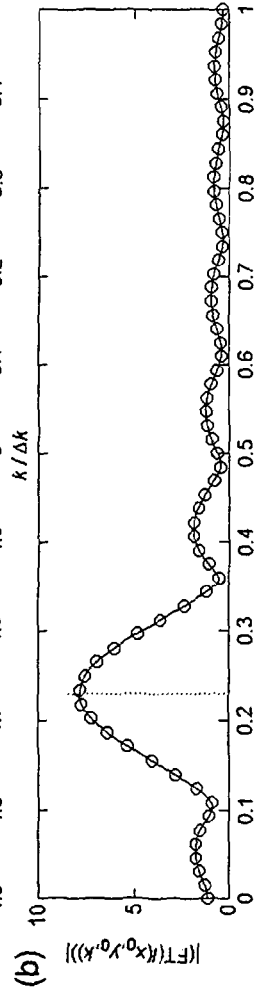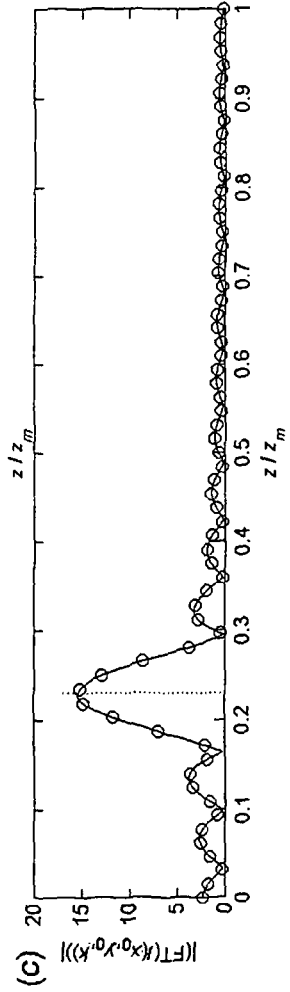
FIG 10A
FIG 10B
FIG 10C

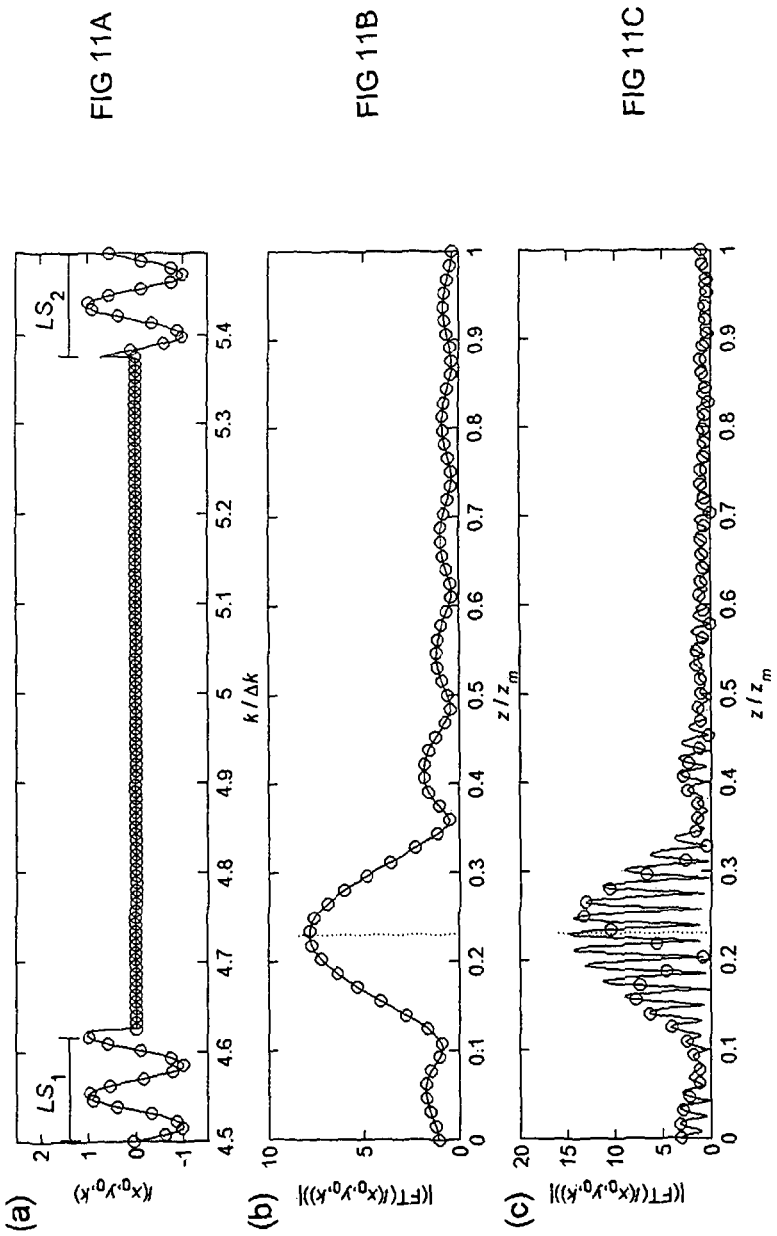

APPARATUS FOR THE ABSOLUTE MEASUREMENT OF TWO DIMENSIONAL OPTICAL PATH DISTRIBUTIONS USING INTERFEROMETRY

This invention relates to an apparatus for the absolute measurement of two dimensional optical path distributions, and particularly, but not exclusively, to such an apparatus for measuring three dimensional profiles.

It is known to measure absolute optical path differences using interferometry. Interferometry is a well-established optical technique for measuring distances between an object and a reference surface to an accuracy of a small fraction of the wavelength of light. Although sometimes used in a point-wise or linewise configuration, it is at its most powerful when used to provide two-dimensional information in the form of interferograms. Examples of commercial applications include optical component testing, displacement field measurement using speckle interferometry, and profilometry of small scale mechanical and electronic devices using scanning white light interferometry (SWLI).

The general equation for the intensity distribution from a two-beam interferometer is set out below:

$$I(x,y,k) = I_0(x,y) + I_1(x,y)\cos[kz(x,y)+\phi] \quad (1)$$

where x and y are two image plane coordinates, z is the optical path difference between an object and the reference waves, $\phi_0$ is a phase shift between the waves, k is the wavenumber $2\pi/\lambda$ where $\lambda$ is the wavelength of the beams, and $I_0$ and $I_1$ are respectively the dc ($I_0$) and modulation ($I_1$) intensities. If a narrow band light source such as a laser is used, Eqn. (1) is applicable to many different classes of two-beam interferometer (e.g. Michelson, Mach-Zehnder etc.) with either smooth or speckled wavefronts.

A known method of analysing interferograms produced using a single wavelength interferometer is to introduce known phase shifts $\phi_0$. By varying $\phi_0$ over time and recording a series of interferograms, a set of equations can be written down from which the wrapped phase distribution $\phi_w = W\{kz(x, y)\}$ can be extracted, where W denotes the wrapping operator that wraps a given phase value onto the range $-\pi$ to $\pi$[1] The true optical path difference function, z(x,y), on the other hand is proportional to the unwrapped phase distribution $\phi_u$:

$$z(x,y) = \phi_u(x,y)/k \quad (2)$$

$\phi_u$ is related in turn to $\phi_w$ as follows:

$$\phi_u(x,y) = \phi_w(x,y) + 2\pi v(x,y) \quad (3)$$

where v(x, y) is an integer field variable.

The process of phase unwrapping, i.e. determining the vv(x, y) field, can be trivial for the case of optical path differences that vary smoothly with x and y. However, in many situations this is not the case. Whenever the spatial phase gradient magnitude exceeds a value of $\pi$ per pixel, there may be no unique solution for v(x,y) based on the phase data alone and phase unwrapping then becomes impossible. Even when the phase field is continuous, the unwrapped phase distribution is uncertain to a constant integral multiple of $2\pi$. This may be termed the uniqueness problem of conventional interferometry at a single wavelength.

A second problem is that of the finite acquisition time required to measure several interferograms (or intensity images) and perform the phase shift between them. Environmental disturbances (vibration, turbulence, etc) can cause large errors in the imposed phase shift and hence in the measured phase.[2,3] This second problem can be effectively eliminated through the use of spatial (as opposed to temporal) phase shifting techniques and pulsed laser illumination. However such techniques do not overcome the uniqueness problem.

One partial solution to the uniqueness problem described above is to record interferograms at two different wavelengths, $\lambda_1$ and $\lambda_2$. Whereas with single wavelength interferometry the path difference is unknown to an integral multiple of $\lambda$, with two wavelengths the path difference is unknown to an integral multiple of $\lambda_s$, the synthetic wavelength, given by $$\lambda_s = \lambda_1 \lambda_2 / |\lambda_1 - \lambda_2| \quad (4)$$

Although this approach can improve the unambiguous path difference by an order of magnitude, at visible wavelengths this still corresponds to a sub-10 μm unambiguous optical path range. Increasing $\lambda_s$ by reducing $|\lambda_1-\lambda_2|$ increases the risk of an unwrapping error, and therefore requires a greater number of intensity measurements to achieve sufficient signal to noise ratio. The time needed to acquire sufficient datapoints means that such full-field two-wavelength systems are sensitive to environmental disturbance.

Another solution involves the use of tunable laser sources in a technique called Wavelength Scanning Interferometry (WSI). A video camera is used to record sequences of interferograms at a set of discrete wavelengths.[4-6] The multiple wavelengths approach provides significantly better dynamic range than two-wavelength interferometry, but the need to record long image sequences again makes the technique vulnerable to environmental disturbance.

A third solution which forms the basis of many existing commercial absolute path length measuring instruments is the so-called Scanning White Light Interferometer (SWLI).[7-9] In a SWLI, broad-band illumination is used to illuminate the sample. High visibility fringes are observed only in those regions of the sample where the optical path difference is close to zero. By mechanical scanning of the sample or reference mirror, the position of maximum fringe visibility is recorded on a pixel-wise basis allowing a complete path-difference map to be produced once all the points within the field of view have passed through the zero path difference surface. A problem with this technique is that there is a need for expensive mechanical scanning devices. In addition, the technique is susceptible to environmental disturbance.

According to a first aspect of the present invention there is provided an apparatus for the absolute measurement of a two dimensional optical path distribution comprising:
  a light source for illuminating an object with light having a plurality of wavelengths;
  an interferometer for forming an image of at least part of the object, which image comprises a broad band interferogram;
  a hyperspectral imager in optical communication with the interferometer for spectrally separating the broad band interferogram into a plurality of narrow band two dimensional interferograms;
  a register for spatially registering the narrow band interferograms;
  an extractor for extracting one dimensional intensity signals from corresponding pixels in each narrow band interferogram; and
  a calculator for calculating the frequency for each point on the object from a one dimensional intensity signal associated with that point.

According to a second aspect of the present invention there is provided an apparatus for measuring three dimensional shape of an object, the apparatus comprising an apparatus according to the first aspect of the invention.

The present invention thus provides a 2-D interferometer that is adapted to simultaneously illuminate an object to be measured with light having a plurality of wavelengths. Different wavelength bands are then separated using the hyperspectral imaging system forming part of the invention.

The term "hyperspectral imager" is used herein to describe a device used for carrying out hyperspectral imaging.

The term "hyperspectral imaging" is used herein to describe a process involving the simultaneous acquisition of images of the same area in a plurality of narrow, contiguous spectral bands.

Hyperspectral data obtained through hyperspectral imaging processes comprises a plurality of contiguous spectral bands. A hyperspectral imager may be used to obtain hyperspectral data comprising any number of contiguous spectral bands.

Because a plurality of wavelengths is contained in the incident light, the uniqueness problem mentioned hereinabove is solved. In addition because the object to be measured is simultaneously illuminated with light having a plurality of wavelengths, the surface of the object can be profiled in a single shot which in practice eliminates, or reduces the influence of environmental disturbance on the measurement.

By means of the present invention, a plurality of two dimensional narrow band interferograms representing points on the surface of the illuminated object can be produced.

If the object that has been illuminated is optically smooth, the interferograms produced will comprise fringes due to the narrow band width of the illumination used for each interferogram produced.

If the object is optically rough, a speckle field is visible rather than interference fringes. This is because the starting phase of the reflected light is random.

In either case, the interferogram phase at a given pixel changes from one narrow band interferogram to the next by an amount proportional to the z value at that pixel.

The light source may comprise a broadband light source adapted to illuminate the object with light having a range of wavelengths falling within a continuous broadband spectrum.

In another embodiment, the light source may comprise a broadband light source operatively connected to a frequency modulator.

In other embodiments of the invention, the light source may comprise an optical frequency comb source. An optical frequency comb is defined as light comprising a plurality of narrow spectral lines. Usually, the narrow spectral lines are evenly spaced in frequency, although in some embodiments the narrow spectral lines may be unevenly spaced in frequency.

In one embodiment of the invention, the hyperspectral imager comprises a mode-locked laser which may be adapted to operate simultaneously on a plurality of adjacent modes. By operating the laser in this way, an optical frequency comb may be produced.

In another embodiment of the invention the broadband light source may comprise a wavelength-tuneable narrow band light source operably connected to a high frequency modulator such as a high frequency step function generator. By stepping the wavelength of a wavelength-tunable narrow band light source at high frequency, a synthetic, or apparent, frequency comb source may be produced. In such an embodiment of the invention the modulator may be adapted to produce a frequency that is high compared to the inverse time for which the object will be illuminated. In addition, the modulator, for example a step function generator, may be adapted to step through the required wavelengths during a time for which the object is illuminated or for a time required to record a broadband interferogram.

An advantage of having a light source comprising an optical frequency comb source is that light is produced only at desired frequencies.

It is to be understood therefore that within this specification, the term "broadband light source" can be interpreted to include a narrow band light source operably connected to a frequency modulator adapted to tune the wavelength of the narrow band light source with a high frequency. For example, with an exposure time of 1 ms, a modulation frequency of a few kHz or more would satisfy this requirement.

In embodiments of the invention where the light source comprises a broadband light source producing light having a range of wavelengths falling within a continuous band of wavelengths, the hyperspectral imager may further comprise an etalon. The etalon acts a comb filter and serves to allow a discrete set of wavelengths uniformly separated in wavenumber into the hyperspectral imaging system.

In the embodiments described hereinabove in which an optical frequency comb is produced, the apparatus is adapted to spectrally slice the broadband interferogram and produce a plurality of narrow band two dimensional interferograms. Spectral slicing may be described as creating discontinuities in the spectral distribution of the light used to illuminate the object. Light from different spatial locations but of the same wavelength is then placed between gaps created in the spectral distribution.

In an alternative embodiment of the invention, rather than producing a frequency comb, the hyperspectral imager may comprise a sampler for spatially sampling and separating regions of the broadband interferogram onto different parts of the hyperspectal imager.

The sampler may comprise, for example, an array of lenses. In other embodiments the sampler may comprise an array of optical fibres. In yet other embodiments of the invention the device may comprise an array of mirrors.

In each of these embodiments, the dimensions of the components of the sampler such as the individual lenses sampler are smaller than a region of interest on the object.

In such an embodiment of the invention, any hyperspectral imager is used to image slice the broadband interferogram. Image slicing may be regarded as the process of creating discontinuities in the spatial distribution of the light in the image plane of the object. Light of different wavelengths but from the same spatial location is then positioned between gaps created in the spatial distribution.

Further information regarding integral field spectroscopy may be found in J. Allington-Smith "Basic principles of integral field spectroscopy", New Astronomy Reviews 50 244-251 (2006) Liang Gao, Robert T. Kester, Nathan Hagen, and Tomasz S. Tkaczyk, "Snapshot Image Mapping Spectrometer (IMS) with high sampling density for hyperspectral microscopy", Optics Express 18 (14) 14330-14344 (2010).

The register may be adapted to spatially register the two dimensional interferograms such that the region of the sample mapping to a particular pixel within each 2-D interferogram can be also identified within all the other interferograms.

In some embodiments, the sampled k values are uniformly spaced, with the k step value between successive interferograms denoted by $\Delta k$.

The extractor is adapted to extract one dimensional intensity signals from each corresponding pixel and each interferogram. In other words, each narrow band interferogram may be regarded as an image, or sub-image made up of a plurality of pixels. Each pixel in turn may correspond to a point on the illuminated object. Because each of the 2-D interferograms is indexed, it is possible for the extractor to extract one dimensional intensity signals relating to a pixel corresponding to a particular point on the illuminated object from each interferogram.

The calculator is adapted to calculate the frequency for each pixel from the one dimensional intensity signal obtained by the extractor.

Since the frequency for each pixel is proportional to the optical path difference at that pixel, the absolute optical path distribution may thus be deduced.

The hyperspectral imager may comprise a photodetector array.

The narrow band interferograms may be arranged as an array spatially separated on to the photodetector array.

The hyperspectral imager may comprise a diffraction grating positioned downstream of the interferometer and the object. The diffraction grating serves to separate different The hyperspectral imager may comprise a dispersive element positioned downstream of the interferometer and the object. The dispersive element serves to separate different wavebands within the broadband interferogram in order to produce the three dimensional image volume.

The dispersion element may comprise any convenient component and may for example comprise a diffraction grating or a prism.

Alternatively, the hyperspectral imager may comprise a reflection volume hologram positioned downstream of the interferometer into which a plurality of Bragg gratings have been written.

The apparatus may further comprise a data processor, for example a digital computer with associated memory. In such embodiments the array of narrow band interferograms may be read out into the data processor for further processing to allow the optical path difference to be calculated.

The register may be adapted to register the individual sub-images with respect to their x and y coordinates to form a three dimensional intensity distribution. In such an embodiment, the narrow band interferograms are stacked to form a sampled hyperspective image volume extending along the z axis as well as the x and y axis. The z axis represents the wave number of each interferogram. The hyperspectral image volume may be defined as $I(x_m, y_n, k_p)$, where subscripts m, n and p take the values $m=0, 1, 2, \ldots, N_x-1$, $n=0, 1, 2, \ldots, N_y-1$, and $p=0, 1, 2, \ldots, N_k-1$, respectively, where $N_x$, $N_y$ and $N_k$ are the number of sample points along the respective axes.

$N_x$ and $N_y$ are chosen to ensure sufficient numbers of spatial sample points over the field of view (i.e., the product $N_x N_y$ is the number of pixels in the final image of the optical path difference). The spatial separation between adjacent interferograms must be sufficient to ensure no overlap (e.g. a separation by at least $N_x$ pixels in the case where the hyperspectral images separates the images along the x axis). The k separation between adjacent interferograms ($\Delta k$) is chosen so that the system can cover a given required depth range by Eqn. (5).

According to Eqn. (1), the measured intensity for a given location (pixel) $x_m=x_0$, $y_n=y_0$ then varies cosinusoidally with k, with angular frequency $z(x_0,y_0)$. The frequency can be measured by performing a 1-D Fourier transform of the intensity values $I(x_0,y_0,k)$ with respect to k, after subtraction of the mean value, and then searching for the peak of the transform which is located at $z=z(x_0,y_0)$. This process is repeated at all the $(x_m, y_n)$ pixel locations, thereby providing absolute two-dimensional optical path difference distributions from a single shot measurement.

The additional information provided by the k axis allows the reliable determination of the absolute path length even though the field of view may contain spatially separated regions, which would therefore be impossible to unwrap correctly from a single narrow band image alone.

The maximum unambiguous depth range is given by the Shannon sampling theorem which states that in order to ensure adequate sampling of the $I(x_0,y_0,k)$ signal, the term $kz(x,y)$ in Eqn. (1) should not change by more than $\pi$ between successive k samples. This leads to a maximum allowed z value of $z=z_m$ where $$z_m = \frac{\pi}{\Delta k}. \quad (5)$$

Any larger z values will be aliased onto a lower z value thus creating an under-sampling artefact.

The minimum allowed value of z, on the other hand, is $z=0$, because the cosine function in Eqn. (1) is even. Negative z values cannot therefore be distinguished from positive ones. The allowable path difference range is therefore given by $$0 \leq z \leq z_m. \quad (6)$$

The discrete Fourier transform $\tilde{I}(x_m, y_n, z)$ contains $N_k/2$ positive frequency components, with a separation between sample points of $$\Delta z = \frac{1}{N_k \Delta k}. \quad (7)$$

The width of the spectral peak (i.e., distance between zero crossing points) is $2\Delta z$ for the case of a uniform spectral profile. If the spectrum is not uniform but rather has a profile $W(k)$, or if $I(x_0,y_0,k)$ is multiplied by a window function $W(k)$ to reduce spectral leakage, then the width of the peak is given by the width of the Fourier transform of $W(k)$, denoted here $\tilde{W}(k)$. In general the width of the spectral peak is $$\delta z = \gamma \Delta z. \quad (8)$$

where the constant y takes the value 2 for a rectangular window, and 4 for a Hamming window, for example.

The precision with which z may be determined may however be much better than the value given by Eqns. (7) and (8). The Fourier transform can be interpolated to provide sub-pixel resolution, for example by Fourier transforming a vector of length $N_z > N_k$, the first $N_k$ elements of which are the $I(x_0, y_0, k)$ vector and the remaining $N_z - N_k$ elements are zero ('zero padding'). An efficient algorithm to find the maximum of a peak in the Fourier transform of a one-dimensional signal to sub-pixel precision was proposed by Kaufmann et al.[10] The ultimate factor limiting the accuracy of such an approach is the noise in the intensity signal.

The z resolution of the hyperspectral imager is inversely proportional to $N_k \Delta k$ by Eqn. (7). In order to improve the resolution $\Delta k$, can be increased. However by Eqn. (5) this reduces the unambiguous path difference range $z_m$ by the same factor. An alternative approach is to increase $N_k$. However this then involves a sacrifice of the lateral resolution. For example, with an image sensor of 16 MPixels and $N_x = N_y = 256$, the maximum value of $N_k = 256$, assuming the full pixel count of the sensor is usable by the hyperspectral imager. $N_k$ can be increased by a factor of 4×, but only at the expense of a reduction in the hyperspectral image size to 128×128. It is desirable simultaneously to achieve both good path difference (z) resolution and good lateral (x, y) resolution. One way to achieve this is based on the use of two or more spectrally non-overlapping broadband light sources with a known wavenumber separation between them.

The apparatus may therefore comprise a plurality of broadband light sources for illuminating the object. The plurality of broadband light sources produce light bands that do not overlap, spectrally with one another, and are separated from one another by a known wave number separation.

The plurality of broadband light sources may produce bands of light that are spectrally adjacent to one another. Alternatively, the broadband light sources may produce light bands that are spectrally separated each other. The separation may be any desired separation.

Because of the disadvantages of the SWLI technique mentioned above, SWLI is generally considered to be an off-line quality control tool. Despite the disadvantages of SWLI, however, it is widely used for measuring the 3-D profile of small scale components because of its ability to measure discontinuous objects unambiguously and its excellent height resolution.

By means of the present invention however the 3-D profiling of small scale components (the dimensions of the measurement volume may typically range from tens of μm to tens of mm) may be achieved using a technique which requires a short exposure time. The required exposure duration depends on factors such as the power of the light source, the illuminated field of view, spectral sensitivity of the photodetector array, sample reflectivity, etc. Typical values may be under 1 ms for reflective samples of order 1 mm across illuminated with a 10 mW superluminescent LED, down to under 1 μs with multi-watt supercontinuum sources. At 1 μs duration, and a wavelength of under 1 μm, the sample can be moving at speeds of up to 250 mm s$^{-1}$ before the sample motion significantly affects the fringe visibility. Even higher velocities can be accommodated by using pulsed light sources. The present invention may thus be used as an in-line quality control tool even in environments generally considered non-conducive to accurate interferometric measurements.

The present invention may be used to measure the 3-D profile of small scale components by noting that the optical path difference is twice the local distance of a sample to be measured from the surface of zero optical path difference L as set out below:

$$z = 2[h_0 - h(x,y)], \quad (9)$$

where $h_0$ is the known distance from the sample datum surface to the plane of zero optical path difference, and $h(x, y)$ is the local sample height measured relative to the datum. Measurement of absolute optical path (z) distributions using an embodiment of the present invention thus provides absolute height distributions through Eqn. (9).

The present invention may also be used in Optical Coherence Tomography (OCT) in which internal structures within weakly scattering media are measured.

According to a third aspect of the present invention there is provided a method for the absolute measurement of a two dimensional optical path distribution comprising the steps of:
   illuminating an object with light having a plurality of wavelengths by passing the light through an interferometer to produce a broadband interferogram of the object;
   spectrally separating the broadband interferogram to form a plurality of two dimensional narrow band interferograms;
   spatially registering the two dimensional interfograms;
   extracting one dimensional intensity signals from corresponding pixels in each narrow band interferogram; and
   calculating the frequency for each point on the object from a one dimensional signal associated with that point.

The step of spatially registering the two dimensional interferograms may comprise identifying the pixel locations of common points on the sample surface within all the narrow band interferograms.

In some embodiments of the invention, the step of spatially registering the two dimensional interferograms comprises the step of forming a three dimensional intensity distribution of the two dimensional narrow band interferograms. This may comprise the step of registering individual narrow band interferograms with respect to their x and y coordinates, and stacking the registered interferograms along a k axis to form a sample hyperspectral image volume, wherein the k axis represents the wave number of each interferogram.

The step of extracting one dimensional intensity signals from corresponding pixels in each interferogram may comprise measuring the frequency along the k axis through the spatially registered interferograms by one dimensional Fourier transformation, or by
   Fourier transformation of the 1-D signal from all the k data at a given point on a sample surface.

The step of illuminating an object with light having a plurality of wavelengths may comprise illuminating the object with a plurality of light bands from a plurality of light sources, wherein each of the plurality of light bands is spectrally separate from any other light band.

The light bands may be spectrally adjacent to one another. Alternatively, the light bands may be separated from each other by an appropriate spacing.

The method of the invention may be applied to measuring the surface profile of an object. In addition, the method has application in the area of optical coherence tomography.

The invention will now be further described by way of example only with reference to the accompanying drawings in which:

FIG. 1b is a block diagram of the apparatus according to 1a;

Figure 4A:
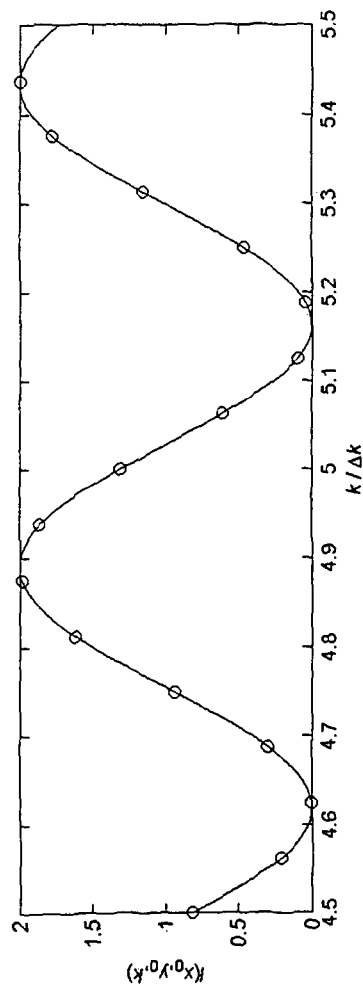
FIGS. 4a and 4b are schematic representations of a 1-D signal taken from FIG. 3.
Figure 4B:
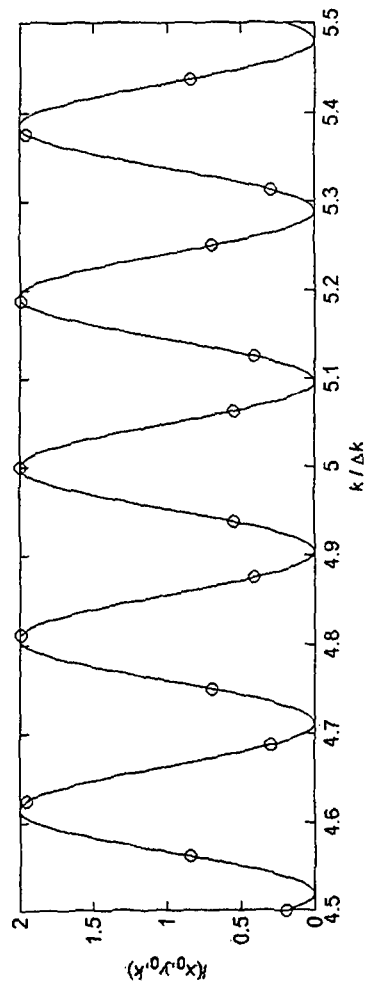
Figure 6:
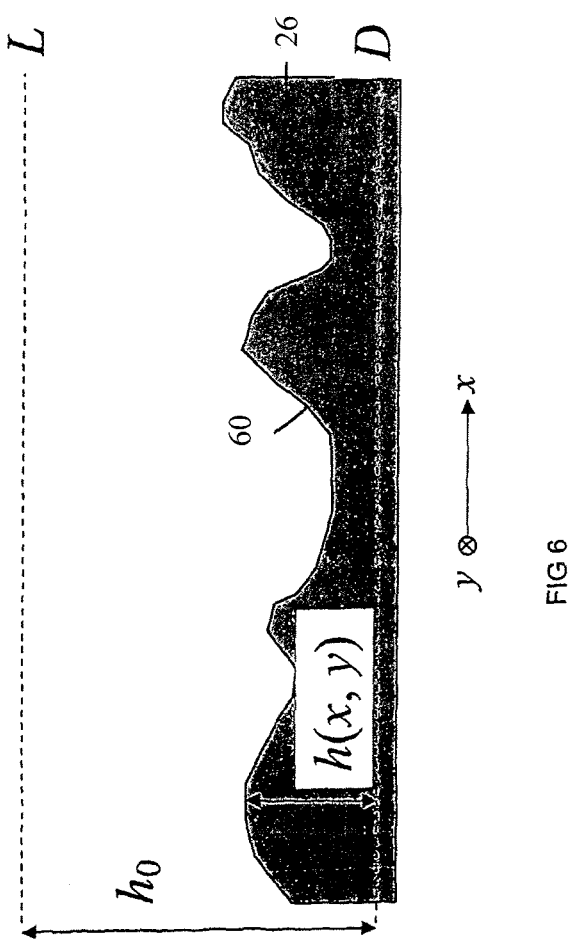
Figure 7:
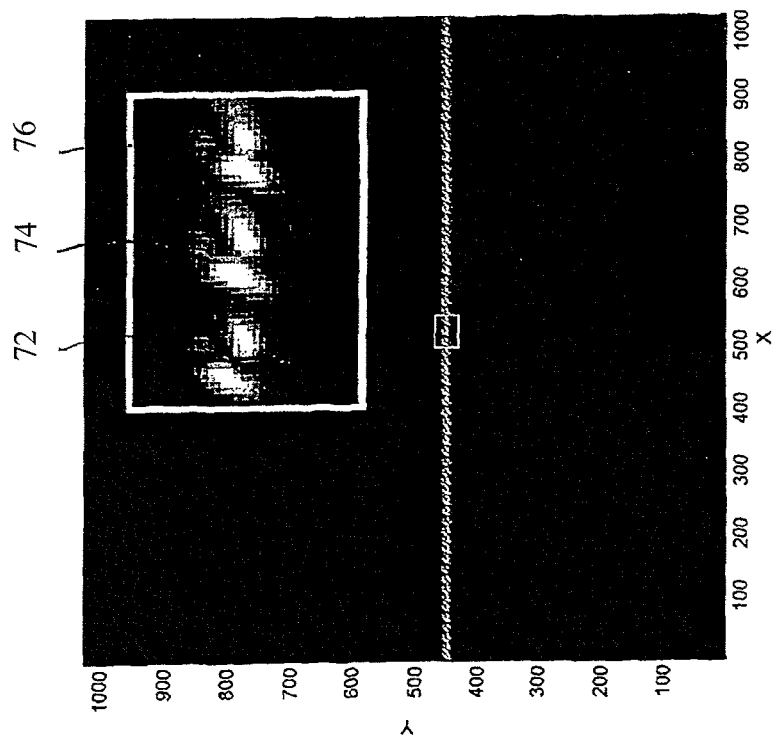
Figure 8:
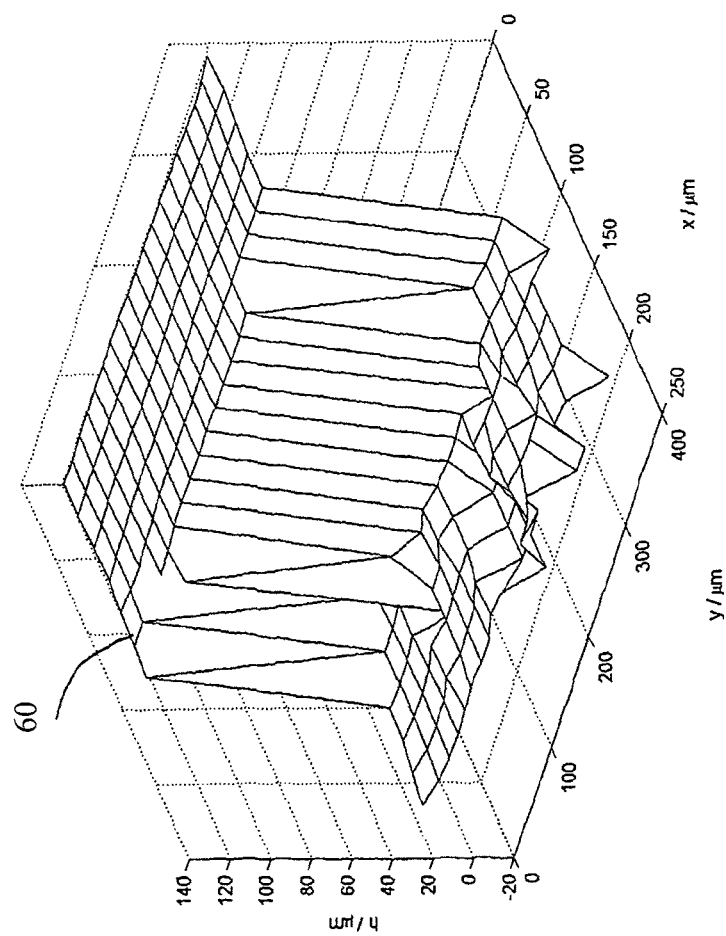
Figure 9:
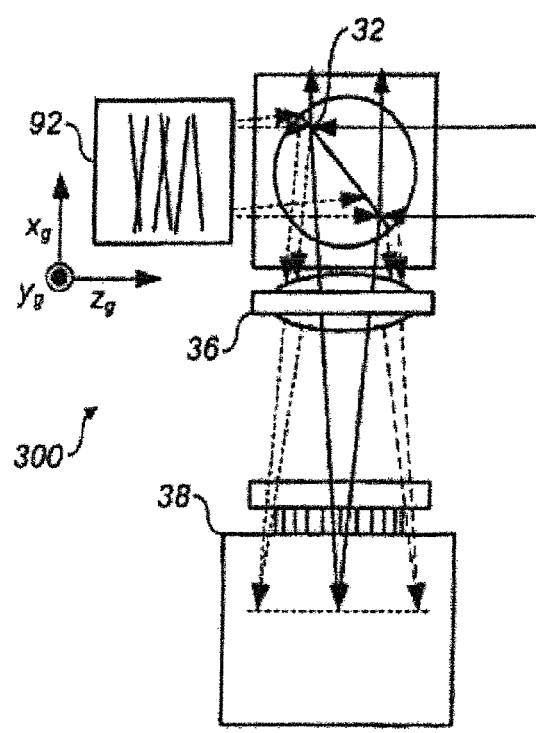

FIGS. 5a and 5b are Fourier transforms $\tilde{I}(x_0,y_0,z)$ of the two 1-D signals $I(x_0,y_0,k)$ from FIGS. 4a and 4b respectively;

FIG. 6 is a cross-sectional representation through the sample;

FIG. 7 is a set of $N_k=62$ hyperspectral images of a stepped surface spread across the horizontal axis of a camera forming part of the apparatus of FIG. 1;

FIG. 8 is a surface profile on 11×19 pixel grid measured using the apparatus of FIG. 1;

FIG. 9 is a schematic representation a hyperspectral imaging element forming part of an apparatus according to a second embodiment of the invention;

FIGS. 10a to 10c are graphic representations of simulated intensity data of an apparatus according to claim 1 with two spectrally adjacent light sources $LS_1$ and $LS_2$;

FIG. 10b is a graphical representation of the Fourier transform of data from $LS_1$ alone;

FIG. 10c is a graphical representation of a Fourier transform of data from $LS_1$ and $LS_2$ combined;

FIG. 11a is a graphical representation of simulated intensity data for the apparatus of FIG. 1 with two spectrally separated light sources $LS_1$ and $LS_2$;

FIG. 11b is a Fourier transform of data from $LS_1$ alone; and

FIG. 11c is a Fourier transform of data from $LS_1$ and $LS_2$ combined.

Figure 1A:
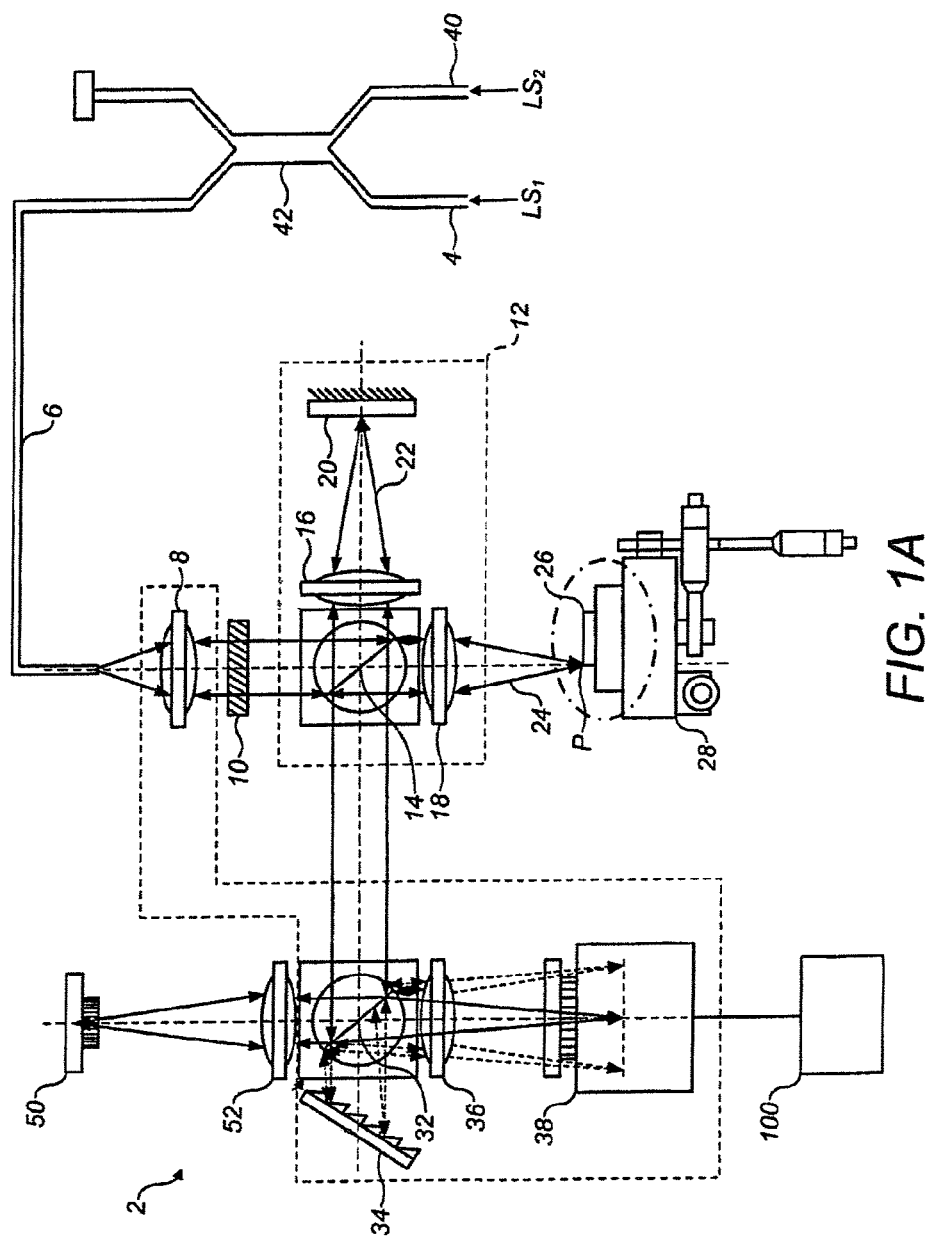
FIG. 1a is a schematic representation of an apparatus according to an embodiment of the invention for measuring the three dimensional profile of an object.
Figure 1B:
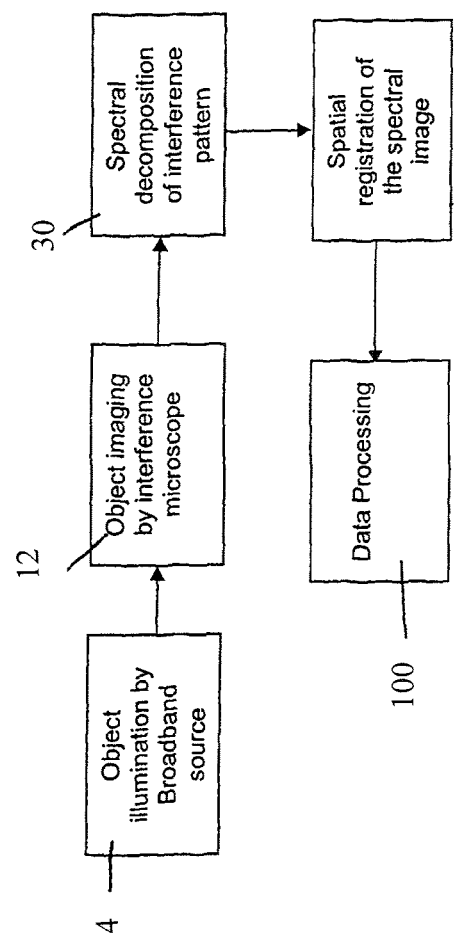

Referring to FIGS. 1a and 1b, an apparatus for measuring the three dimensional profile of a sample 26 is designated generally by the reference numeral 2. The apparatus measures the three dimensional profile of the sample 26 by first of all measuring a two dimensional optical path distribution, as will be described in more detail herein below.

The apparatus 2 comprises broadband light source 4 which in this embodiment comprises a super luminescent LED light source (Superlum Diodes Limited, HP1) having a centre wavelength of 840 nanometers, and a full width half maximum value of 50 nanometers. The light from source 4 is directed by means of an optical fibre 6 to a lens 8 which collimates the light beam. The collimated light beam then passes through an etalon 10 before entering an interferometer indicated by the dotted line 12. The etalon 10 acts a comb filter and passes only a discrete set of wavelengths contained in the broadband light to form a broadband comb with uniform wavenumber separation $\Delta k$ before the collimated light enters the interferometer 12.

The apparatus 2 further comprises a narrow band light source 40 for example produced by a He—Ne laser having a wavelength of 633 nanometers. The narrow band source is useful to align the apparatus with the sample 26 but has no other purpose in respect of the apparatus 2. In some embodiments of the invention therefore there is no narrow band light source 40.

Because, in this example there are two light sources 4, 40, the apparatus further comprises a fibre coupler 42. However, in embodiments of the invention in which there is no narrow band source 40, a fibre coupler 42 would not be necessary.

The interferometer may be any convenient interferometer, and in this case the interferometer comprises a Linnik interferometer. As is known in the art, the interferometer comprises a beam splitter 14, first lens 16, second lens 18 and reference mirror 20. In a known manner, the interferometer 12 splits the incident light into a reference beam 22 and a measuring beam 24. The measuring beam 24 illuminates a portion of sample 26 at a point P. The sample 26 is positioned on a translation stage 28 to allow the sample to be moved in order to illuminate any given area of interest, and to allow the distance between the sample and the interferometer ($h_0$) to be adjusted.

The apparatus 2 further comprises a hyperspectral imager indicated by the dotted line 30 which comprises etalon 10, a beam splitter 32, a diffraction grating 34, lens 36 and camera 38. In this embodiment the diffraction grating 34 is a blazed grating arranged in the Littrow configuration to maximise diffraction efficiency.

The camera 38 comprises a photodetector array.

Light reflected from the sample 26 combines with light reflected form the reference mirror 20 and is directed towards a hyperspectral imager 30. Light from a single point P on the sample 26 produces a bundle of parallel rays that enters the hyperspectral imager 30. The diffraction grating 34 can be used to selectively filter out different wavelengths of light from the interferometer, such that each wavelength is directed onto a different region of camera 38 by the beam splitter 32. In this way a plurality of narrow band interferograms at a number of different wavelengths falling within the broadband wavelength envelope may be produced as will be described in more detail herein below.

The narrow band interferogram images on the photodetector array may then be processed as described in more detail below in order to provide information relating to the three dimensional profile of the object 26.

In this embodiment, the apparatus 2 further comprises a second camera 50 and lens 52 for producing a single high resolution broadband image of the object to assist in alignment of the apparatus, and are thus not an essential part of the invention.

The broadband inteferogram is thus split optically into its constituent interferograms, each formed from a narrow spectral band within the broad spectral illumination envelope produced by light source 4. To achieve this, the grating 34 optically splits the broadband interferogram so that successive interferograms which are formed from a different wavelength or band of wavelengths are produced. The hyperspectral imager then directs the narrow band interferograms to discrete locations in the two dimensional photodetector array. The spectral separation between adjacent interferograms is determined by the Free Spectral Range (FSR) of the etalon, 10, which in this example is 0.5 nm at 840 nm. The spectral width of the bands is determined by the finesse of the etalon, which in this example is greater than 15. In order to achieve spatially sharp narrowband interferograms, it is necessary for the etalon finesse to be comparable to, or greater than, $N_x$, where x is the photodetector axis lying the plane of FIG. 1A.

Figure 2:
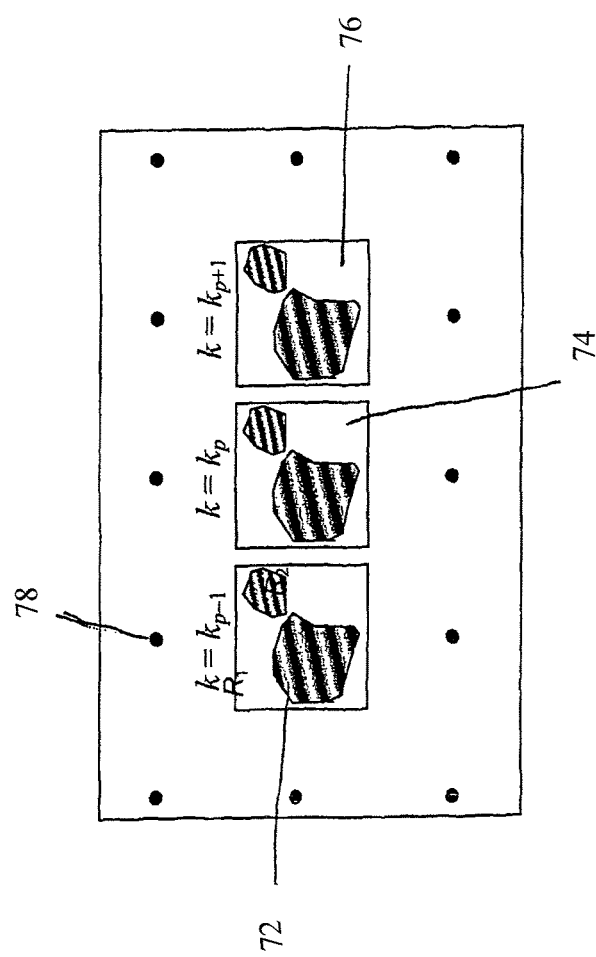
FIG. 2 is a schematic representation of a hyperspectral interferometry image consisting of sub-images of a region of interest in a sample recorded with different k values using the apparatus of FIG. 1.

FIG. 2 shows three such schematic narrow band interferograms 72, 74, 76 of a region of interest of object 26 with different k values. The three representative interferograms 72, 74, 76 are shown as part of a rectangular array of interferograms each centred on a circle 78 formed in the two dimensional photodetector array. In the apparatus 2 described here, the array contains just a single row of interferograms.

Each of the interferograms 72, 74, 76 may contain spatially separated regions R1, R2. Nevertheless, by means of the present invention the absolute optical path length may be reliably determined.

Figure 3:
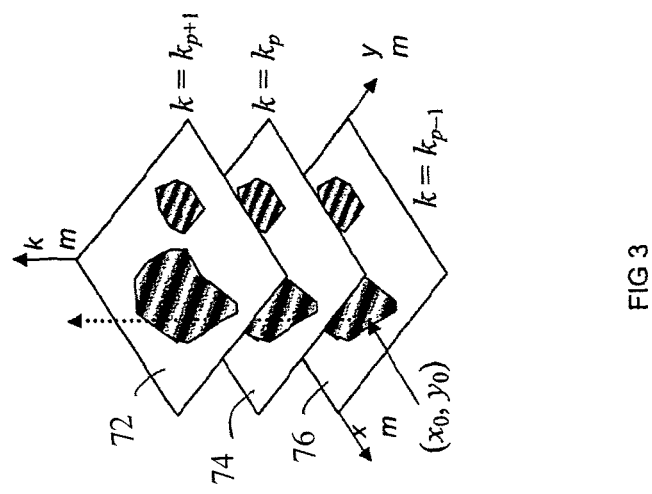
FIG. 3 is a schematic representation of the sub-images of FIG. 2 forming a hyperspectral interferometry volume.

FIG. 3 is a plurality of interferograms of the type shown in FIG. 2 which have been spatially registered and stacked to form a 3-dimensional intensity distribution by means of computer 100 to produce a plurality of narrow band interferograms at a number of different wavelengths.

FIGS. 4a and 4b are schematic representations of a sampled $I(x_0, y_0, k)$ distribution for two z values $z=0.23\ z_m$ and $z=0.65\ z_m$ for the case $N_k=16$ and a total k bandwidth equal to 20% of the centre k value. The corresponding Fourier transforms $\tilde{I}(x_0, y_0, z)$ are shown in FIGS. 5(a) and (b), respectively.

The precision with which z may be determined may be much better than the values given by equations 7 and 8. As shown by the vertical dotted lines 50, 52 in FIGS. 5a and 5b, the Fourier transform can be interpolated to provide sub-pixel resolution, for example by zero padding the I vector. An efficient algorithm to find the maximum of a peak in the Fourier transform of a one-dimensional signal to sub-pixel precision was proposed by Kaufmann et al.

Turning now to FIG. 6, a schematic representation of the surface 60 of sample 26 is illustrated. Determination of the absolute optical path difference may be used to profile the surface of the object 26 as set out herein below. From FIG. 6 and Eqn. (9) it can be seen that the optical path difference is twice the local difference of the sample from the surface of zero optical path difference L. The factor of 2 arises because of the double pass (the light is incident in the downward vertical direction and leaves in the upward vertical direction), and it is assumed that the refractive index of the medium in front of the specimen is unity.

Measurement of absolute z distributions using apparatus 2 thus provides absolute height distributions using equation 9 set out above.

Turning now to FIG. 7, an image is shown that is segmented into individual interferograms of the type shown in FIG. 2. The interferogram spacing which is approximately proportional to the frequency of grating 34, the focal length of lens 36, and the Free Spectral Range of the etalon 10, is adjusted to match the field of view defined by the diameter of the illuminating spot on the sample (26) and the magnification of the imaging system. These are then assembled by computer 100 to form the hyperspectral image volume as shown in FIG. 3. 1-D Fourier transformation along the k axis, followed by peak searching algorithm, provides the absolute optical path length on a pixel-wise basis, from which the height distribution is calculated using equation 9.

The result is shown in FIG. 8 which shows the surface profile of surface 60 on an 11×19 pixel grid which is measured using the apparatus of the present invention in a single shot. The step in the surface profile that fell within the illuminated part of the sample is reproduced in the computed 3-D profile, and the calculated step height agrees to within experimental error.

Turning to FIG. 9, a second embodiment of the invention will now be described. FIG. 9 illustrates schematically a hyperspectral imager 300 which can replace the hyperspectral imager 30 forming part of the apparatus 2 illustrated in FIG. 1.

The hyperspectral imager 30 illustrated in FIG. 1 uses a planar diffraction grating 34 to separate the constituent hyperspectral images along a line. An image sensor which is long compared to its height is therefore needed in order to avoid the wasted pixels that occupy the dark regions of FIG. 7 above and below the single row of hyperspectral images. Most commercially available image sensors are however of 1:1, 4:3 or 16:9 aspect ratio, and an alternative means of separating the broadband image onto multiple rows of narrowband images is therefore desirable.

According to the embodiment of the invention shown in FIG. 9, instead of a diffraction grating, the hyperspectral imager 300 comprises a reflection volume hologram 92 into which sets of Bragg gratings have been written.

Each Bragg grating 92 consists of a low-amplitude sinusoidal modulation of the material's refractive index with a unique grating pitch and unique angle of tilt about the $x_g$ and $y_g$ axes, where ($x_g$, $y_g$, $z_g$) is the local coordinate system defined in FIG. 9. Each grating reflects with high efficiency light from within a narrow spectral window defined by the Bragg condition,[12, 13] thereby sending the image of the point to a separate portion of the photodetector array. The fact that the gratings can be written into the holographic element with tilts about both $x_g$ and $y_g$ axes means that the full area of the photodetector array is usable, unlike the case with the planar grating considered in FIG. 1a.

In such an embodiment the etalon 10 is not required. Furthermore, by using curved Bragg gratings, the imaging function implemented by the upstream and downstream lenses in the apparatus of FIG. 1 can also in principle be implemented within the volume grating element, thus potentially avoiding the need for lenses 16 and 36.

In addition to the efficient use of all the available pixels in camera 38 of FIG. 1a, this approach also allows tailor made placing of images from sources of arbitrary spectral profile. This feature is particularly useful in the embodiment of the invention described below which uses two spectrally-separated light sources.

The concept is illustrated in FIGS. 10 and 11 which consider two cases: (i) where the two spectral bands are immediately adjacent to one another (FIG. 10(a)); and (ii) where they are separated by 6× the width of each band (FIG. 11(a)). In both cases the true z value used in the simulations was $z/z_m$=0.23. Both situations require the acquisition of identical numbers of hyperspectral images (16 from each source).

The Fourier transform of the signal from the first light source, shown in FIGS. 10(b) and 11(b), is identical for the two cases. If the signal from both sources is Fourier transformed, then the peak width is reduced by approximately two times in the case of spectrally-adjacent light sources (FIG. 10(c)). In the case of the spatially-separated light sources, on the other hand, the main peak takes the same width as for the single source case, but is modulated by a signal whose frequency is proportional to the separation of the two sources. Provided the correct sub-peak is chosen within the main peak, the increased 'sharpness' of this peak means that the z resolution is significantly improved compared to the adjacent-band case, with no change in the number of acquired sub-images.

The algorithm to identify the sub-peak location consists of the following steps:

1. obtain the first estimate of z ($z=z_1$) as the maximum value of the modulus of the discrete Fourier transform of the mean-free signal from the first spectral band (the circles in FIG. 11(b)), 2. use $z=z_1$ as the initial estimate of z for an iterative search for the peak (at $z=z_2$) of the continuous Fourier transform of the mean-free signal from the first spectral band (the continuous line in FIG. 11(b)), 3. use $z=z_2$ as the initial estimate of z for an iterative search for the peak (at $z=z_3$) of the continuous Fourier transform of the mean-free signal from both spectral bands (the continuous line in FIG. 11(c)).

The above algorithm was applied to simulated data consisting of the fringe data shown in FIG. 11(a), but with the addition of independent Gaussian noise of standard deviation equal to 0.01 to each measured intensity value. The effect of the intensity noise is to induce fluctuations in the computed z value. The mean and standard deviations of the calculated z, normalized by $z_m$, are set out in Table 1 below for the three cases: (i) single source (16 datapoints total); (ii) spectrally-adjacent dual source (32 datapoints total) and (iii) spectrally-separated dual source (32 data points total). A total of 1024 runs was used to generate these values. The standard deviation of the computed z values from the spatially-separated sources is almost an order of magnitude less than that from the spatially-adjacent sources, and is about 1 part in 60,000 of the total depth measurement range.

Effect of intensity noise on the computed normalized z value for three different Hyperspectral Interferometry light source spectra (true value is $z/z_m$=0.23).

| | Mean | Standard deviation |
|---|---|---|
| Single spectral band | 0.2315 | $2.67 \times 10^{-4}$ |
| Two adjacent spectral bands | 0.2288 | $1.01 \times 10^{-4}$ |
| Two separated spectral bands | 0.2299 | $0.15 \times 10^{-4}$ |

The performance of the present invention can thus be improved by separating the upper and lower halves of the spectral range. In general, the larger the separation, the better the depth resolution. At some point, the improvement in resolution will be offset by a reduction in the detection reliability due to mis-identification of the correct sub-peak within the main peak. Further improvements in performance may be achievable by dividing the spectral range into three or more bands.

Optical Coherence Tomography (OCT) is an interferometric technique, developed primarily for medical applications, for measuring internal structures within weakly scattering media. Spectral OCT refers to the use of a spectrometer to measure the spectral content of backscattered light from pointwise illumination of the sample.[14] Extension from pointwise to line illumination allows both the structure (from the magnitude information) and the displacement field (from the phase information) to be measured on a plane within the sample in a single shot.[15] However, in order to spatially register two dimensional information, for example to build up 3-D volumes with either pointwise or linewise illumination, it is necessary to perform a scan of the point or line across the sample. Thus conventional spectral OCT suffers from the same motion artefact problems as WSI and the other interferometric techniques outlined above in respect of 3-D shape profiling. In vivo measurements are therefore in practice often restricted to 2-D measurements.

The invention is directly applicable to the single-shot measurement of 3-D magnitude and phase volumes. The magnitude of the Fourier transform of the measured intensity data $\tilde{I}(x_m, y_n, z)$ provides a direct measure of the scattering potential along the line extending from pixel $(x_m, y_n)$, through the centre of the camera lens and into the sample surface. Likewise the phase of the Fourier transform can be used to measure displacement within the 3-D volume in a similar manner to the 2-D technique described in Reference 15. As with the 3-D profiling example described earlier, motion artefacts can be removed by reducing the duration of the illumination pulse, and no moving parts are required to achieve the scan.

REFERENCES

1. Huntley, J. M., "Automated analysis of speckle interferograms", in "Digital speckle pattern interferometry", ed. P. K. Rastogi, John Wiley & Sons Ltd., Chichester (2001).
2. P. de Groot, "Vibration in phase-shifting interferometry," J. Opt. Soc. Am. A 12, 354-365 (1995).
3. J. M. Huntley, "Suppression of phase errors from vibration in phase shifting interferometry," J. Opt. Soc. Am. A 15 (8) 2233-2241 (1998).
4. S. Kuwamura and I. Yamaguchi, "Wavelength scanning profilometry for real-time surface shape measurement," Appl. Opt. 36, 4473-4482 (1997).
5. F. Lexer, C. K. Hitzenberger, A. F. Fercher, and M. Kulhavy, "Wavelength-tuning interferometry of intraocular distances," Appl. Opt. 36, 6548-6553 (1997).
6. P. de Groot, "Measurement of transparent plates with wavelength-tuned phase-shifting interferometry," Appl. Opt. 39, 2658-2663 (2000).
7. T. Dresel, G. Häusler, and H. Venzke, "Three-dimensional sensing of rough surfaces by coherence radar," Appl. Opt. 31, 919-925 (1992).
8. P. Sandoz and G., Tribillon, "Profilometry by zero-order interference fringe identification", J. Mod. Opt. 40 1691-1700 (1993).
9. L. Deck and P. de Groot, "High-speed noncontact profiler based on scanning white-light interferometry", Appl. Opt. 33 7334-7338 (1994).
10. G. H. Kaufmann, A. Ennos, B. Gale and D. J. Pugh, "An electro-optic readout system for analysis of speckle photographs," J. Phys. E: Sci Instrum. 13 579-84 (1980).
11. J. Schwider and L. Zhou, "Dispersive interferometric profilometer," Opt. Lett. 19, 995-997 (1994).
12. P. Hariharan, "Basics of Holography", Cambridge University Press, Cambridge, (2002).
13. L. C. Cao, X. S. Ma, Q. S. He, H. Long, M. X. Wu and G. F. Jin, "Imaging spectral device based on multiple volume holographic gratings", Opt. Eng. 43 2009-2016 (2004).
14. A. F. Fercher, C. K. Hitzenberger, G. Kamp, and S. Y. El-Zaiat, "Measurement of intraocular distances by backscattering spectral interferometry," Opt. Commun. 117, 43-48 (1995).
15. M. H. De la Torre-Ibarra, P. D. Ruiz, and J. M. Huntley, "Double-shot depth-resolved displacement field measurement using phase-contrast spectral optical coherence tomography", Opt. Express 14 9643-9656 (2006).

The invention claimed is:

1. An apparatus for the absolute measurement of a two dimensional optical path distribution comprising:
   a light source for illuminating an object with light having a plurality of wavelengths;
   an interferometer for forming an image of at least part of the object, which image comprises a broad band interferogram;
   a hyperspectral imager in optical communication with the interferometer for spectrally separating the broad band interferogram into a plurality of narrow band two dimensional interferograms; and
   at least one processor configured to spatially register the narrow band interferograms, extract one dimensional intensity signals from corresponding pixels in each narrow band interferogram, and
   calculate the frequency for each point on the object from a one dimensional intensity signal associated with that point.

2. An apparatus according to claim 1 wherein the light source comprises a narrow band light source operatively connected to a frequency modulator.

3. An apparatus according to claim 1 wherein the light source comprises an optical frequency comb source.

4. An apparatus according to claim 1 wherein the hyperspectral imager further comprises an etalon.

5. An apparatus according to claim 1, wherein the hyperspectral imager comprises a dispersion element positioned downstream of the interferometer.

6. An apparatus according to claim 1 wherein the hyperspectral imager comprises a reflection volume hologram positioned downstream of the interferometer, into which a plurality of Bragg gratings have been written.

7. An apparatus according to claim 1, wherein the hyperspectral imager comprises a photodetector array.

8. An apparatus according to claim 1 comprising a plurality of light sources for illuminating the object.

9. An apparatus according to claim 8 wherein the bands of light produced by the plurality of broadband light sources are spectrally separate from one another.

10. A method for the absolute measurement of a two dimensional optical path distribution comprising the steps of:
   illuminating an object with light having a plurality of wavelengths by passing the light through an interferometer to produce a broadband interferogram of the object;
   spectrally separating the broadband interferogram to form a plurality of two dimensional narrow band interferograms;
   spatially registering the two dimensional interfograms;

extracting one dimensional intensity signals from corresponding pixels in each narrow band interferogram; and calculating the frequency for each point on the object from a one dimensional intensity signal associated with that point.

11. A method according to claim 10 wherein the step of illuminating an object with broadband light comprises the step of modulating a narrow band light with a high frequency in order to produce a synthetic, or apparent, broadband light source.

12. A method according to claim 10 wherein the step of spatially registering the two dimensional interferograms comprises identifying the pixel locations of common points on the sample surface within all the narrow band interferograms.

13. A method according to claim 10 wherein the step of spatially registering the two dimensional interferograms comprises a step of forming a three dimensional intensity distribution of the two dimensional narrow band interferograms.

14. A method according to claim 13 wherein the step of forming a three dimensional intensity distribution of the two dimensional narrow band interferograms comprises the step of registering individual narrow band interferograms with respect to their x and y coordinates, and stacking the registered interferograms along a k axis to form a sample hyperspectral image volume, wherein the k axis represents the wave number of each interferogram.

15. A method according to claim 10 wherein the step of extracting one dimensional intensity signals from corresponding pixels in each interferogram comprises measuring the frequency along the k axis through the spatially registered interferograms by one dimensional Fourier transformation.

16. A method according to claim 12 wherein the step of illuminating an object with broadband light comprises illuminating the object with broadband light from a plurality of light sources to produce a plurality of bands of broadband light, wherein each band is spectrally separate from any other band.

17. A method according to claim 11 wherein the step of spatially registering the two dimensional interferograms comprises identifying the pixel locations of common points on the sample surface within all the narrow band interferograms.

18. A method according to claim 11 wherein the step of spatially registering the two dimensional interferograms comprises a step of forming a three dimensional intensity distribution of the two dimensional narrow band interferograms.

19. A method according to claim 11 wherein the step of extracting one dimensional intensity signals from corresponding pixels in each interferogram comprises measuring the frequency along the k axis through the spatially registered interferograms by one dimensional Fourier transformation.

* * * * *